US 6,666,089 B2

(12) United States Patent
Dilz, Jr.

(10) Patent No.: US 6,666,089 B2
(45) Date of Patent: *Dec. 23, 2003

(54) MINIATURE SPORTS RADAR SPEED MEASURING DEVICE

(75) Inventor: Albert E. Dilz, Jr., Cincinnati, OH (US)

(73) Assignee: Sports Sensors, Inc., Cincinnati, OH (US)

( * ) Notice: Subject to any disclaimer, the term of this patent is extended or adjusted under 35 U.S.C. 154(b) by 63 days.

This patent is subject to a terminal disclaimer.

(21) Appl. No.: 10/005,708

(22) Filed: Dec. 3, 2001

(65) Prior Publication Data

US 2002/0162391 A1 Nov. 7, 2002

Related U.S. Application Data

(63) Continuation-in-part of application No. PCT/US01/12535, filed on Apr. 17, 2001, which is a continuation of application No. 09/550,735, filed on Apr. 17, 2000, which is a continuation-in-part of application No. 09/471,906, filed on Dec. 23, 1999, and a continuation-in-part of application No. 09/471,905, filed on Dec. 23, 1999, and a continuation-in-part of application No. 09/233,556, filed on Jan. 20, 1999, now Pat. No. 6,079,269, which is a continuation of application No. 08/796,665, filed on Feb. 5, 1997, now Pat. No. 5,864,061.

(60) Provisional application No. 60/113,434, filed on Dec. 23, 1998, and provisional application No. 60/113,378, filed on Dec. 23, 1998.

(51) Int. Cl.$^7$ .................................................. G01P 1/07

(52) U.S. Cl. ........................................................ 73/488

(58) Field of Search .......................... 73/488, 657, 167, 73/514.27; 273/371, 378; 473/415, 180, 190, 192, 198, 199, 458, 451, 455; 342/115, 104, 99

(56) References Cited

U.S. PATENT DOCUMENTS

| | | | |
|---|---|---|---|
| 3,781,879 A | 12/1973 | Staras et al. |
| 3,852,743 A | 12/1974 | Gupta |
| 3,895,366 A | 7/1975 | Morris |
| 3,896,435 A | 7/1975 | Constant |
| 4,030,097 A | 6/1977 | Gedeon |
| 4,184,156 A | 1/1980 | Petrovsky et al. |
| 4,276,548 A | 6/1981 | Lutz |
| 4,509,052 A | 4/1985 | Cash |
| 4,759,219 A | 7/1988 | Cobb et al. |

(List continued on next page.)

*Primary Examiner*—Helen Kwok
(74) *Attorney, Agent, or Firm*—Wood, Herron & Evans, L.L.P.

(57) ABSTRACT

A sensor is provided for measuring the speed of a moving sports object, particularly an object being shot or launched, for example, from a gun, bow or other implement, such as a bullet or paint ball being shot from a gun or an arrow being shot from a bow. The sensor is operable over a short range and is preferably mounted in close proximity to the path of the moving object. The sensor of the preferred embodiment utilizes CW Doppler radar in the form of a microwave radio frequency transmitter and receiver that has a single-transistor integrated antenna/oscillator. A simple, low cost unit having a low radiation and low energy consumption transmitter, receiver and signal processor, is provided. In use, the unit is situated so as to place a transmit/receive antenna close to or in the line of motion of the object. Such an antenna, so positioned, may be separated from the unit and connected through a transmission line. The remote display/annunciator can also or in the alternative be separated and located remote from the transmitter/receiver and connected by a cable or a wireless link. Paint ball gun marker velocity or bullet velocity can be measured or the gun calibrated with a sensor antenna on the gun barrel, and archery arrow velocity can be measured or calibrated with a sensor fixed to a bow.

15 Claims, 4 Drawing Sheets

U.S. PATENT DOCUMENTS

| | | |
|---|---|---|
| 4,801,880 A | 1/1989 | Koike |
| 4,915,384 A | 4/1990 | Bear |
| 5,092,602 A | 3/1992 | Witler et al. |
| 5,133,213 A | 7/1992 | Bernstein et al. |
| 5,199,705 A | 4/1993 | Jenkins et al. |
| 5,315,306 A | 5/1994 | Doughty et al. |
| 5,401,026 A | 3/1995 | Eccher et al. |
| 5,419,549 A | 5/1995 | Galloway et al. |
| 5,471,405 A | 11/1995 | Marsh |
| 5,553,846 A | 9/1996 | Frye et al. |
| 5,570,094 A | 10/1996 | Armstrong |
| 5,723,786 A | 3/1998 | Klapman |
| 5,761,096 A | 6/1998 | Zakutin |
| 5,779,555 A | 7/1998 | Nomura et al. |
| 5,796,354 A | 8/1998 | Cartabiano et al. |
| 5,864,061 A | 1/1999 | Dilz, Jr. |
| 6,079,269 A * | 6/2000 | Dilz, Jr. ............ 73/488 |
| 6,378,367 B1 * | 4/2002 | Dilz, Jr. ............ 73/488 |

* cited by examiner

MINIATURE SPORTS RADAR SPEED MEASURING DEVICE

This application is a Continuation-In-Part of International Application No. PCT/US01/12535, filed Apr. 17, 2001, hereby expressly incorporated by reference herein, which is a continuation and claims priority to U.S. patent application Ser. No. 09/550,735, filed Apr. 17, 2000, hereby expressly incorporated by reference herein, which is a Continuation-In-Part of:

U.S. patent application Ser. No. 09/233,556, filed Jan. 20, 1999, now U.S. Pat. No. 6,079,269, which is a Continuation of U.S. patent application Ser. No. 08/796,665, filed Feb. 5, 1997 and now U.S. Pat. No. 5,864,061;

U.S. patent application Ser. No. 09/471,905, filed Dec. 23, 1999, which is based on U.S. Provisional Patent Application Serial No. 60/113,378, filed Dec. 23, 1998; and U.S. patent application Ser. No. 09/471,906, filed Dec. 23, 1999, which is based on U.S. Provisional Patent Application Serial No. 60/113,434, filed Dec. 23, 1998;

which are each hereby expressly incorporated herein by reference.

BACKGROUND OF THE INVENTION

A number of methods and devices have been proposed for measuring the speed of objects such as baseballs and tennis balls and projectiles such as arrows and bullets. One class of such methods and devices uses a time-distance measurement in which two positions of the moving object are defined, and the times at which the object is present at each position is measured, the elapsed time of the travel of the object between the two positions is computed from the time measurements, and the known distance between the positions is divided by the elapsed time to calculate the speed of the object. The devices for such measurements typically require multiple optical or other sensors. Such methods and systems can produce valid speed measurements, but the cost or complexity of device design, setup and use can present disadvantages to the user.

Another class of speed measurement devices uses continuous wave (CW) Doppler radar technology. Devices in this class use reflected waves, sometimes sonic in nature, but frequently radio frequency electromagnetic radiation (RF). RF systems can be used to detect moving objects by illuminating the object with the electromagnetic field of the radar and producing an electrical signal at a Doppler frequency which is a measure of the relative speed of the moving object. This technology has been pioneered and developed by the defense industry in the United States, is well documented in textbooks and reports, and has found numerous applications in consumer products. Security motion sensors, industrial position sensors and police radar units are examples of current uses of Doppler radar systems.

Doppler radar has been used in sports applications to measure the velocities of sports objects or players relative to one another or relative to a reference point. Examples of sports radar in use are found in U.S. Pat. No. 4,276,548 to Lutz and U.S. Pat. No. 5,199,705 to Jenkins et al. Conventional sports radar includes "speed guns" for measuring baseball or softball speed, such as disclosed in the Lutz patent. Available sports radar units generally occupy considerable volume, for example approximately 200 cubic inches, which requires that they be maintained stationary when used. Further, such systems may cost several hundred dollars. These units are typically operated by a third person somewhat remote from the players or the objects being measured.

Implementation of prior art CW Doppler radar systems is relatively complex, generally involving the use of an RF oscillator and signal generator, an antenna system to radiate the oscillator output into free-space and to receive a portion of the transmitted electromagnetic energy that is reflected by the moving object, a transmit/receive switch, diplexer, or circulator device if a single antenna is used for both transmit and receive rather than separate transmit and receive antennas, and various local oscillators, mixers, phase-locked-loops and other front-end circuits to heterodyne, demodulate and detect the Doppler signal. This complexity imposes high cost and size requirements on the radar units, which have heretofore discouraged the utilization of CW Doppler technology in consumer applications where extremely small size and low cost are necessary for practical end product realization.

In electronics applications unrelated to those discussed above, Doppler radar systems using simple homodyne circuits have been known. Such applications include defense applications such as ordnance proximity fuzes and target detectors where Doppler modulation provides evidence of a target encounter. Validation of the presence of target signals within a prescribed Doppler frequency passband, and the detection of amplitude build-up as the target encounter distance decreases, are sufficient for signal processing and decision making in such systems, obviating the need to accurately measure or calculate the specific velocity magnitude or speed. For example, for general proximity sensing applications, mere detection of an increasing distance signal is satisfactory. However, applications requiring a speed measurement necessitate determination of the specific Doppler frequency and a calculation of a corresponding speed value. Such homodyne circuits are but among hundreds or thousands of circuits and modulation schemes that in some way carry speed information but which have not been considered practical for providing speed measurements. Accordingly, circuits of a size or cost that are practical for consumer applications such as sports object speed measurement have not been known or available.

Existing Doppler speed measuring devices suffer from loss of accuracy due to the inability to place the unit in or close to the path of the moving object, resulting in a reduction in the speed measurement to the cosine of the angle between the object's velocity vector and the line of the Doppler signal between the unit and the moving object. Further, the Doppler units must be positioned where they are not subjected to damage by collision with the object.

Accordingly, a need exists for a low cost, effective, small size, low power device useful for measuring and displaying or otherwise outputting the speed of objects in consumer applications such as sports and sports training.

SUMMARY OF THE INVENTION

A primary objective of the present invention is to provide a small size, low cost, low power device for measuring object speed that is practical for consumer applications, particularly recreation and sports. It is a particular objective of the present invention to provide a sports radar unit for measuring and outputting the velocity magnitude or speed of a sports object or projectile being propelled or shot by a user or from some form of launching implement. It is a more particular objective of the invention to provide such a speed measurement apparatus and method for measurement of the speed of balls, bullets, markers, paintballs, arrows, and other objects being shot, thrown or launched by a user or from a gun, bow or other launcher or similar implement.

According to some embodiments of the present invention, there is provided a radar speed sensor that is small in size, low in cost, low in power consumption and radiated energy, that measures and outputs the speed of an object. The sensor also may display the measured speed to a user. Further according to other embodiments of the invention, a radar unit is provided that is adapted for mounting at or near the path or point of reception of the moving object, particularly at the location of, or on, the implement or person from which the object is being shot or otherwise launched. The unit produces a radar speed measurement and produces an output signal that can operate a display or other device that interprets the speed measurement.

The positioning of the speed measuring unit is such as to facilitate the use of a low power, short range signal and accurate speed measurement. In the illustrated embodiments, the unit employs continuous-wave Doppler radar and transmits and receives RF energy in a microwave frequency range, for example, a frequency of approximately 2.4 GHz or 5.8 GHz or higher. Frequencies in the 10–25 GHz range can, for example, be used. A frequency of 5.8 GHz, for example, is suitable for a number of sports applications. Governmental regulations restrict the available frequencies differently in different countries. The frequency is 10.5 GHz may be required in some countries, and the 10.5 GHz frequency, which is available in most countries, is useful where narrow-beam low-power radiation is desired.

The speed measuring unit according to one embodiment of the invention, includes a radar transmitter and receiver that employs a single simple CW Doppler homodyne circuit preferably having an oscillator-detector that is based on a single transistor, which utilizes resonant circuit elements of the oscillator as an antenna to radiate energy into free-space. A portion of the radiated energy strikes the nearby moving object and is reflected back to the oscillator-antenna circuit where it is mixed with the oscillator signal. The coherent relationship of the transmitted and received signals in a simple homodyne circuit produces a Doppler frequency modulation as the distance to the moving object changes.

The illustrated embodiments of the present invention make use of the phenomena whereby, at a given separation distance between the radar and the moving object, the received object-reflected signal is exactly in-phase with, and reinforces, the oscillator signal, but as the separation distance changes by each one-quarter wavelength of the transmitted signal, the total two-way travel distance to the object and back changes by one-half wavelength, resulting in an out-of-phase or canceling relationship between the received and transmitted signals. Each distance change of one-half wavelength results in a two-way radar round trip change of one wavelength, thus producing one complete cycle of modulation. As the distance to the moving object changes by successive one-half wavelength increments, multiple cycles of modulation are produced. The frequency of this modulating signal is the Doppler frequency, which is equal to the velocity of the moving object expressed in terms of one-half wavelengths of the transmitted signal as follows:

$$f_D = \frac{v}{\lambda_t/2} = \frac{2vf_t}{c}$$

where:
$f_D$ is the frequency of Doppler modulation,
v is the relative velocity of the moving object,
$\lambda_t$ is the wavelength of the transmitted signal,
$f_t$ is the frequency of the transmitted signal, c is the magnitude of the velocity of electromagnetic energy propagating in surrounding medium (free-space in this case) and is equal to the product of frequency and wavelength.

In certain embodiments of the invention, such a resulting Doppler signal, which modulates the oscillator signal, is detected by filtering it out of the incoming signal, amplifying it, filtering it again and converting it to a digital signal, preferably using a zero-crossing detector (ZCD). The output of the ZCD is ideally a square wave having a frequency that is the Doppler frequency. The detected digitized Doppler frequency signal is applied to the input port of a microprocessor, which measures the time between negative-going zero-crossings using an internal timer. The measurement of zero-crossing intervals are compared to certain criteria to verify that a valid signal is being processed. Then a Doppler frequency value is calculated from the measured zero-crossing information by taking the time between zero-crossings in the same direction as is equal to the period of the Doppler frequency. Using the above formula, the velocity of the moving object toward the sensor, for example, the speed of a thrown ball approaching the sensor, is then calculated. The calculated velocity magnitude is displayed on a small liquid crystal display (LCD).

The radar unit of the invention may be located in close proximity to the path of the object whose speed is being measured. It may, for example, be located such that the object moves within one or a few feet of the speed measuring device. This arrangement may place the radar unit within a few inches of the object whose speed is being measured for at least a portion of the flight of the object and within a few feet of the object for long enough for substantially all of the speed measurement to be made. For measuring projectiles from shooting implements, the radar unit is positioned so that the object is moving almost directly away from the unit with the speed of the object being measured within close proximity to the unit. In certain embodiments of the invention, the antenna of the unit may positioned in or very close to the path of the moving object with a signal processing portion of the unit positioned remote from the antenna and connected to the antenna by a transmission line. The antenna is typically of a fixed length and, if remote from the other circuitry of the unit, may be connected to the circuitry with a coaxial, parallel conductor or other transmission line that is impedance matched and designed into the RF detector circuitry.

By so locating the speed measuring radar unit immediately adjacent the path of the object whose speed is being measured and providing the unit with a short range of effectiveness of less than ten feet, and preferably of from one to three feet, velocity errors due to off-line location are minimized, since the Doppler frequency represents the velocity of the object in a direction toward or away from the radar unit. Mounting the radar unit on a gun barrel or archery bow, for example, places the unit in an effective location. With such placement, transmitter output power can be in the order of microwatts, which is much less than the radiated power levels of most wireless consumer products such as cellular and portable telephones. Short range detection avoids false readings of speed due to the motions or movement of the launching implement, a target or other item that might be in the field of view of the radar antenna.

The display may be positioned on the unit itself facing rearwardly so that the shooter or other user can read the output upon launching the object. The unit can alternatively provide an output signal that may be transmitted, through cable or a wireless link, to a remote display or other device.

Mounted on a gun barrel or archery bow, the antenna portion of the radar unit may face the target while the display is oriented on the back of the radar unit so it is visible to the shooter or may be located elsewhere. An LCD, a battery and a power supply are located in the unit, with switches located on the unit and accessible to the user. The unit may also include a real time display such as that of a conventional digital wristwatch, which can share the battery and power circuit with the speed measuring device and utilize the display of the device to display time of day or elapsed time.

The radar velocity sensor can be operated from a 2.5 VDC battery power supply, requiring an average current of less than one milliampere. Thus, a single 3 volt nominal lithium cell capable of 160 milliampere-hours can power the sensor for a relatively long duration. Small, inexpensive cylindrical and button configuration lithium cells with this energy capability are readily available and are widely used in consumer products. Power "ON/OFF" and "Reset" switches are provided which are easily operated by the one hand of the user.

The velocity measurement device of the present invention is capable of being miniaturized and produced inexpensively so that it can be used in consumer applications, which, up to now, have not heretofore been addressed by the prior art. It can be built into, or attached to, a baseball or softball glove, to measure the speed of the ball being caught. The radar can be worn on the person of the user or on a launching implement. A radar unit can be built directly into the implement.

According to certain applications of the present invention, speed measurement of other sports objects is provided in applications where small portable devices may be used. For example, paint ball guns used in survival games and training use air pressure to propel paint balls or markers at other players. To avoid injury to the players being shot with the markers, the velocity of the markers at the barrels of the guns is limited to, for example, 300 feet per second. To optimize the trajectory of the markers, it is desirable to calibrate the guns so that the marker is as close to the upper velocity limit without going over the limit. One embodiment of the invention contemplates the fixing of a speed measuring unit or the antenna thereof on the barrel of the marker gun closely adjacent the barrel with the antenna aimed parallel to the barrel and the path of the marker. The device is adjusted to process Doppler readings for a speed range of, for example, 150 to 450 feet per second. To accommodate such speeds, band pass filter and clock speed settings are made to differ from those used for baseballs, etc. Depending on the anticipated speed of the object being measured, such settings should be made to exclude signals below and above the anticipated speed range to eliminate erroneous readings, and the timing should be such that a series of speed readings are made of the speed of the object traveling in the range of the signal.

Further, in archery competition, the trajectory of an arrow depends on precise control of the speed of the arrow leaving the bow. As in the paint ball application, the speed measuring device can be attached to a bow to measure the speed of an arrow leaving the bow. The device is preferably fixed to an extension forward of the bow, closely adjacent the path of the arrow. For example, the device may be fixed ahead of the tip of the arrow when the bow is drawn and at about or slightly ahead of the midpoint of the arrow when the rear of the arrow is resting against the undrawn bowstring. The device may, accordingly, be fixed on the end of a counterbalance bar that is fixed to and extends forward of the bow.

As with paint ball guns, firearms may be provided with the speed measuring device of the invention to measure the velocity of a bullet leaving the barrel of the gun. Parameters of the speed measuring device, for such an application, would be set to accommodate object speeds of from about several hundred to a few thousand feet per second.

These and other objectives and advantages of the present invention will be more readily apparent from the following detailed description of the illustrated embodiments of the invention, in which:

DETAILED DESCRIPTION OF THE PREFERRED EMBODIMENT

Figure 1:
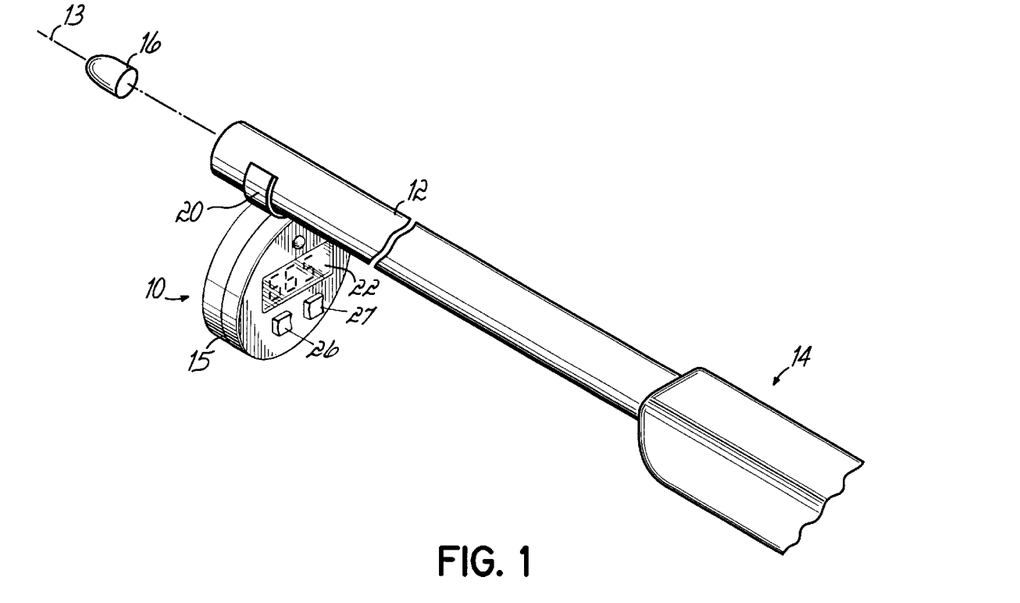
FIG. 1 is a diagrammatic perspective view of a speed measuring device according to certain preferred embodiments of the invention.
Figure 2:
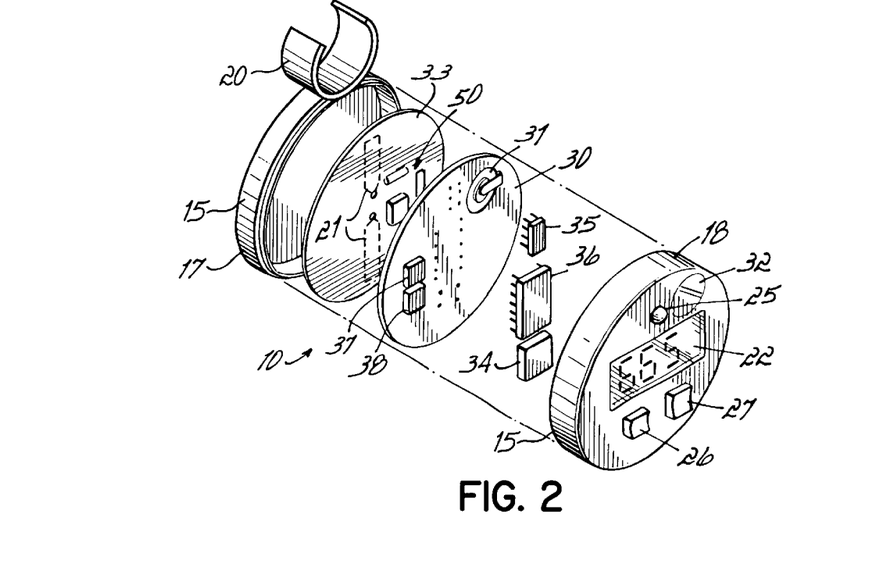
FIG. 2 is an exploded perspective view of the speed measuring device of FIG. 1.

FIG. 1 illustrates one embodiment of a speed measuring device or unit 10, according to principles of the present invention, secured to the barrel 12 of a rifle or other firearm 14. The firearm 14 is illustrated immediately after having fired a bullet 16 from its barrel 12. The path of the bullet 16 is illustrated by line 13. The device 10, so secured to the barrel 12, is located within a few inches of the direct path 18 of movement of the bullet 16 being fired from the gun 14. The device 10, in the illustrated embodiment, has a two part plastic housing 15 that includes a forward facing housing 17 and a rearward facing housing 18, as illustrated in FIG. 2. In the illustrated embodiment of the unit 10, the two parts of the housing 17, 18 are secured together to form a single enclosure that contains the electronics of the unit 10. The forward facing housing 17 is secured by a fastening element or bracket 20, for example, configured or configurable to attach to the barrel 12 of the gun 14. The housing 15 encloses an antenna 21 (FIGS. 2 and 3) with a radiation pattern having a main lobe that faces in the direction that the barrel 12 is pointing parallel to, or inclined slightly toward, the path 13 in the direction of the receding bullet 16. The rearward facing housing 18 contains a speed output annunciator, for example, a visual display 22 such as an LCD having, for example, a digital readout of two to four digits. On the rearward facing housing 18 there is also provided one or more control buttons, such as, for example, a plurality of buttons 25–27, and including particularly button 25, which is a unit on/off switch. A second button 26 may be a mode switch that permits sequential selection of the units of the display 22, for example, in miles per hour, kilometers per hour, feet per second or meters per second. A third button 27 may be a reset or start button that powers the transmitter for a predetermined amount of time, such as ten or fifteen seconds, after which the transmitter of the unit will turn off. Alternatively, the function of the on/off button 25 and reset button 27 may be combined so that a momentary depression of the button 25 powers the entire unit, which turns off automatically after the predetermined amount of time.

As further illustrated in FIG. 2, between the forward and rearward facing housings 17 and 18 is a circuit board 33 that contains the transmitting and receiving circuitry, and a signal processing circuit board 30 that contains the signal processing and logic of the unit 10. The circuit board 30 includes a battery 31 that is replaceable through an access door 32 in the rearward facing housing 18. The board 33 contains components and circuitry of a transmitter/oscillator circuit, which includes the strip transmission line resonator/antenna 21. The circuit board 30 contains a signal filter and processor 34 that processes the detected Doppler signal that is produced in the RF circuit by the moving object, an operational amplifier-based voltage regulator chip 35 that provides filtered regulated voltage to the signal processor chip 34 at about one-half the supply voltage of the battery 31, a microprocessor 36 that digitizes output from the signal processor 34 and interprets the detected signal as a speed reading and communicates the interpreted signal to the display 22, and clock and delay circuits 37, 38, respectively, that are used by the microprocessor 36.

An alternative embodiment of the unit 10 may be configured for attachment to the gun or implement 14 with at least the antenna 21 positioned adjacent the path 13 of the object whose speed is being measured, but with the control button 25, display 22 and others of the components remote from the antenna.

Figures 3, 3A:
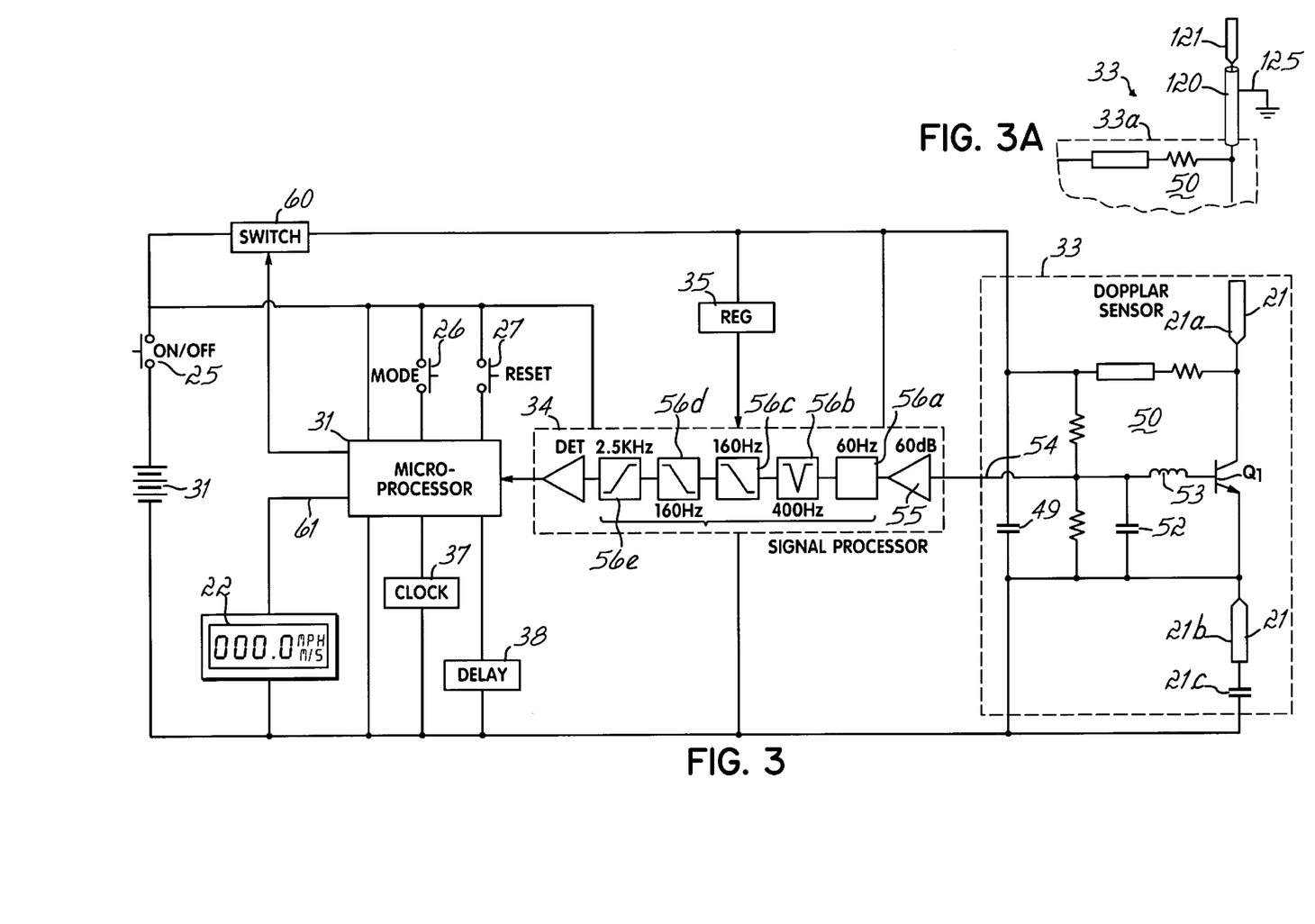
FIG. 3 is a schematic block diagram of one embodiment of circuitry of the speed measuring device of FIG. 1.
FIG. 3A is a schematic block diagram of the RF detector and antenna portion of the circuitry of FIG. 3 illustrating an embodiment having a remote antenna.

The electronics of the units 10 illustrated in FIG. 3 can be fabricated utilizing readily available components. The Doppler sensor circuit 33 is preferably a CW radar homodyne oscillator-detector 50 having an integral antenna circuit by which the moving object 16 is detected. The oscillator preferably operates at between 5725 and 5875 MHz, but may also operate at 2400–2425 MHz or at other frequencies, typically in the 2,000 to 25,000 MHz region. The oscillator 50 of the preferred embodiment draws about 0.6 milliamperes from a 2.5 VDC power source such as the battery 31. Partially because of the location and configuration of the units 10, less than ten microwatts need be transmitted into free-space by the oscillator resonant elements. These elements are preferably of a strip transmission line configuration that includes two electrically equivalent quarter wave micro-strip lines that form radiating elements 21a, 21b of the antenna 21. The elements 21a, 21b, along with a transistor Q1 and a coil 53, form a negative resistance network which oscillates with a capacitor 21c at the operating carrier frequency of, for example, 2.4 GHz, 5.8 GHz or 10.5 GHz. A transmission line 51 and capacitor 49 are provided to prevent parasitic oscillations in the bias network. Capacitor 52 is a bypass capacitor which creates a low impedance to ground for the carrier frequency, partially filtering the carrier signal at an outlet 54 at which the received Doppler signal can be extracted. Typical objects the size of a baseball or softball within a distance of about two feet from the radar, produce a reflected Doppler frequency signal having an amplitude in the 10 to 100 microvolt range. This signal modulates the oscillator signal at the Doppler sensor output 54 of the sensor circuit 33.

A portion of the modulated oscillator signal that has been filtered within the oscillator circuit 33 and fed on the outlet 54 into the signal processor 34 consists of a commercially available AC or capacitively coupled high-gain differential amplifier 55, several stages of filters 56 and a ZCD 57. The gain of the differential amplifier 55 is preferably set at a gain of about 1000, or 60 dB. The filters 56 produce a 400–2500 Hz passband, or whatever other passband needed to cover the range of anticipated Doppler frequency signals expected to be encountered given the speed range of the object and the transmission frequency being used. The filters 56 include, for example, standard twin-tee configuration operational amplifier based 60 Hz and 120 Hz notch filters 56a, 56b to suppress AC power circuit interference. The filters 56 also include two second-order, multiple feedback high-pass filters 56d, 56e each having a gain, for example, of 2.7, and each having a 3 dB cutoff frequency of 160 Hz. Next, the filters 56 include a single order passive low-pass filter 56e having, for example, a 3 dB cutoff frequency of 2500 Hz. The passband can be tailored to fulfill specific needs by selection of the corresponding low and high pass filter component values which establish the corner frequencies. The amplified and filtered signal from the filtering stages 56 is fed to the ZCD 57, which is a standard Schmitt trigger that uses a commercial comparator, with positive feedback to create hysteresis. The ZCD produces a square-wave which is output and applied to the input of an eight-bit microprocessor 36.

The microprocessor 36 is connected to external clock circuit 37 which provides a time reference to the microprocessor 36. The microprocessor 36 is programmed to verify the validity of the received signal, for example, by requiring at least four consecutive Doppler frequency cycles, which causes it to recognize the received signal as a valid Doppler signal reading. When a reading is determined to be a valid Doppler signal reading, the microprocessor calculates the corresponding velocity. The microprocessor 36 has an output 61 that communicates a signal representative of the calculated Doppler speed measurement through appropriate drivers (not shown) to the LCD 22 for display. The calculation is made by detecting successive negative edge zero-crossings following the depression of the reset button 27, which triggers a microprocessor interrupt that samples the clock 37 to cause the times of each crossing to be stored and so the intervals between them can be calculated. The sampling is terminated after 26 successive negative transitions are stored, or there has been a dead time of at least ⅙ second since the last transition, indicating that the object or target is no longer moving. Once the data has been captured, the differences between transition times are calculated, from which the Doppler frequency is determined. In making the calculations, the microprocessor 36 enhances the speed reading validity by starting with the difference between the first two recorded time readings and then looking for a sequence of at least three consecutive periods that are within 25% of each other. If none is found, the process is started over and additional readings are stored. When three consecutive readings within 25% of each other are found, the data is scanned until three consecutive readings are not within 25% of each other, whereupon the calculations are averaged. The averaged calculated Doppler frequency value is then converted to the selected units and displayed. Velocity can be displayed in miles per hour, kilometers per hour or meters per second in the preferred embodiment, selectable by the user by way of the MODE switch 26, which is a pushbutton switch which, when depressed, sequentially steps the display 22 through the various units, as is convenient for the user.

The electronics are powered by a power supply formed of the battery 31 which is connected/disconnected by the ON/OFF switch 25, which controls signal power to the microprocessor 36, the signal processor 34 and display 22.

However, the oscillator transmitter circuit power is controlled by the READY, or RESET switch 27 through the microprocessor 36 when the battery power switch 25 is "ON". Activation of the RESET switch 27 causes the microprocessor 36 to close a transmitter power switch 60 which applies electrical power to the transmitter/Doppler sensor circuit 33 for a prescribed time interval (e.g. 10–15 seconds) controlled by the time delay circuit 38, or until an object velocity signal is calculated as controlled by the microprocessor 36, whichever occurs first, after which the transmitter 33 and signal processor circuit 34 are deactivated as the microprocessor causes the switch 60 to turn "OFF". Activation of the RESET switch 26 causes the microprocessor 36 to reset the LCD 22, which is holding the previously calculated velocity value, and to re-apply power to the transmitter 33 and signal processor 34 for performing the next detection and velocity measurement. In this manner, the transmitter radiated output is limited to just the period of time of actual measurement usage, and battery power is also conserved.

Easily packaged in a volume of about 1–3 cubic inches are: a single transistor oscillator-detector-antenna circuit 33, signal processor 34 with the Doppler bandpass amplifier and the zero-cross detector, eight-bit microprocessor velocity calculator and transmitter controller 36, liquid crystal display 22, single-cell battery power supply 31 and ON/OFF and RESET switches 26, 27. For example, the specific embodiment described above can be packaged in a volume of less than two cubic inches using discrete circuit components, and, with appropriate utilization of a custom application-specific integrated circuit (ASIC) and at a frequency of about 5.8 GHz, the device can be packaged in a volume of approximately one-half cubic inch. At higher frequencies of 10 to 25 GHz, which can be used, the package size will be essentially the preferred size of the display or is otherwise determined by other components of the unit.

More detailed embodiments of the speed measuring device described above are described in pending U.S. patent application Ser. Nos. 09/471,905 and 09/471,906, referred to above.

Figure 4:
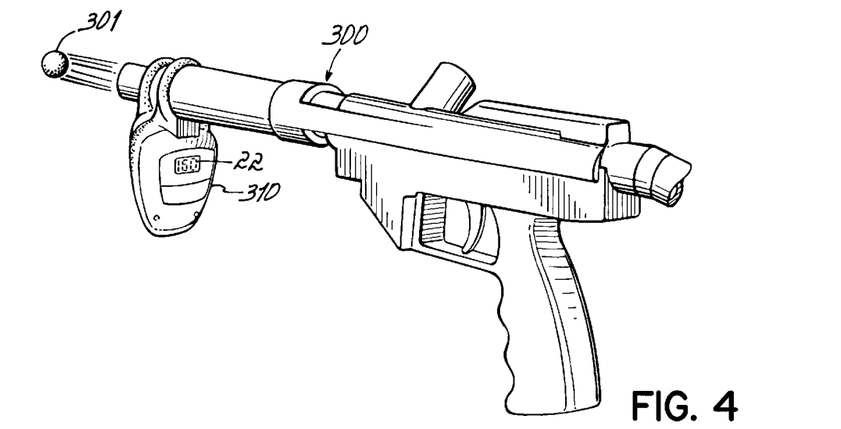
FIG. 4 is a perspective view of an alternative embodiment of the speed measuring devices of FIGS. 1–3 for measuring marker speed leaving the barrel of a paint ball gun.

In FIG. 4, an embodiment of a speed measurement device 310 is illustrated mounted on a paint ball gun 300 to measure the speed of a paint ball marker 301 shot from the gun. The device 310, so used, provides a way to calibrate the gun 300 so that the speed of the marker 301 approaches but does not exceed a maximum marker velocity limit of, for example, 300 feet per second. A self contained device 310 may be mounted on the barrel of the gun 300 as illustrated in FIG. 4, with the antenna directed in the direction in which the gun 300 is pointing, or a remote antenna element 321 may be mounted on the barrel close to the barrel centerline, with the remaining circuitry 33a located rearwardly of the antenna element 121 and connected to the antenna 121 through the transmission line 120.

Figure 5:
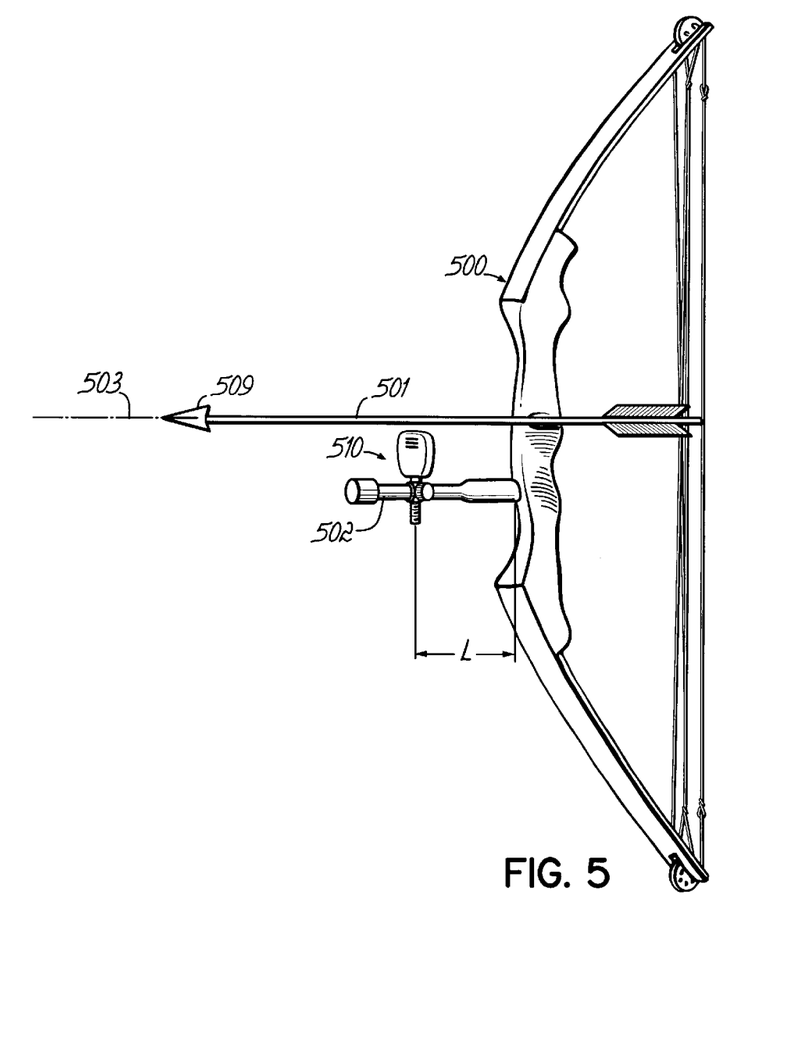
FIG. 5 is a perspective view of an alternative embodiment, similar to that of FIG. 4, for measuring the speed of an arrow leaving an archery bow.
Figure 5A:
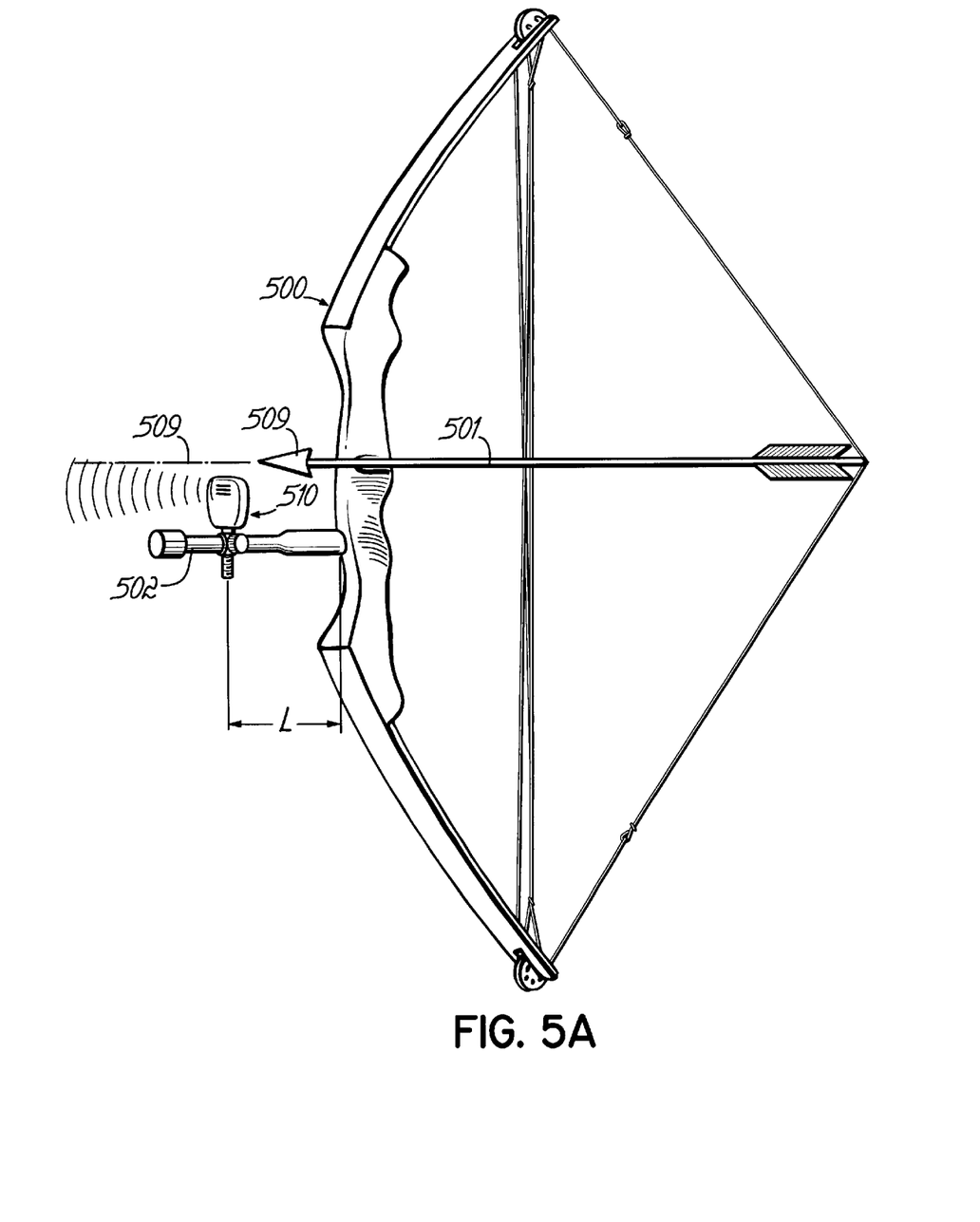
FIG. 5A is a perspective view similar to FIG. 5, illustrating the location of the speed measuring unit in relation to an arrow on an archery bow with the bow drawn.

FIG. 5 illustrates an arrow speed measuring embodiment 510 for use in archery, which operates in a manner similar to that of the paint ball marker speed measuring embodiment 310 of FIG. 4. In the embodiment 510, an archery bow 500 is equipped with the speed measuring device 510 to measure the speed of an arrow 501 shot from the bow. The device 510 may be self-contained and mounted on the end of a counterweight or stabilizer 502 that might normally be employed, which extends from the front of the bow 500 immediately below and parallel to a line 503 that includes the intended path of the arrow 501 as it leaves the bow 500. An alternative extension may be provided instead of the stabilizer 502 to hold the device 510 at a fixed position on the bow 501. Preferably, the speed measuring device 510 is supported on the bow 500 at a distance L about seven inches forward of the front of the bow 500. The device 510 is vertically adjustably mounted on the counterweight 502 so that the antenna thereof can be positioned within about one-half inch of the line 503 defining the path of the arrow 501. The antenna of the device 510 is directed in the direction toward which the arrow 501 is pointing. Alternatively, a remote antenna element may be mounted on the bow 500 close to the arrow 501 with the remaining circuitry and/or display of the device 510 located elsewhere. Where elements of the device 510 are located remote from the antenna, the antenna may be connected to the transmitter receiver of the device 510 through a transmission line and other elements may be further connected through cable or a wireless link to the transmitter or each other. As so positioned on the bow 500, the speed measuring device 510 is located adjacent or just forward of the head 509 of the arrow 501 when the bow is drawn, as illustrated in FIG. 5A.

The rifle, other firearms and other projectile launching or shooting implements may be assembled in the manner of those of FIGS. 1, 4 and 5 described above according to principles of the present invention. With the various embodiments, the Doppler frequencies passed by the filters and the timing of the samples should be set to best accommodate the anticipated speeds being measured.

Other applications of the invention can be made. Those skilled in the art will appreciate that the applications of the present invention herein are varied, and that the invention is described in preferred embodiments. Accordingly, additions and modifications can be made without departing from the principles of the invention.

What is claimed is:

1. A method of measuring the speed of a moving sports object comprising the steps of:

providing a battery powered device that includes a transmitter/receiver, at least one antenna element connected to the transmitter/receiver, a signal processor having an input in communication with the transmitter/receiver, and an output annunciator having an input in communication with the signal processor;

positioning the at least one antenna element on a launching or shooting implement approximately adjacent a path of an object to be shot from the implement, the speed of which is to be measured;

transmitting an RF signal from the at least one antenna element along the path in the direction of motion of the object and reflecting the transmitted signal from the object when the object is shot from the implement;

from the transmitted and reflected signals, generating a Doppler signal of the speed of the object being shot from the implement;

processing the generated Doppler signal with the signal processor and producing therefrom a digital representation of the speed of the object; and outputting the digital representation of the speed of the object with the annunciator.

2. The method of claim 1 further comprising:

locating the annunciator remote from the antenna element.

3. The method of claim 1 further comprising:

locating the transmitter/receiver remote from at least one antenna element with a transmission line extending therebetween.

4. The method of claim 1 wherein:
the transmitting of the RF signal between the antenna element and the transmitter/receiver includes transmitting the RF signal over a transmission line connecting the at least one antenna element to the transmitter/receiver which is located remote from the antenna element.

5. The method of claim 1 further comprising:
providing a wireless communications link connecting the processor with the annunciator.

6. The method of claim 1 for measuring the speed of a marker being shot from a paint ball gun wherein:
locating the at least one antenna element adjacent to a barrel of a paint ball gun and proximate a path of markers shot from the barrel;
radiating the RF signal from the antenna element at the barrel along the path in the direction of the marker being shot from the barrel;
reflecting the RF signal from the marker;
receiving the reflected signal with the antenna element at the barrel and communicating the reflected signal from the antenna element to the transmitter/receiver;
detecting the Doppler signal;
processing the detected Doppler signal with the signal processor and producing therefrom a digital representation of the speed of the marker leaving the barrel; and
outputting the digital representation of the speed with the annunciator.

7. A combination for measuring the speed of an object being shot from a shooting implement comprising:
a shooting implement;
a radar speed measuring device including:
an RF transmitter/receiver,
at least one RF antenna element connected to the transmitter/receiver,
a signal processor having an input in communication with the transmitter/receiver,
an output annunciator having an input in communication with the signal processor, and
a source of electric power connected to the transmitter/receiver, processor and annunciator;
the radar speed measuring device being mounted such that the at least one antenna element is approximately adjacent a path of an object to be shot therefrom and is directed along the path in the direction of motion of the object.

8. The combination of claim 7 for measuring the speed of a projectile being shot from a gun, wherein:
the implement is a gun having a barrel; and
the speed measuring device is mounted on the barrel such that the at least one antenna element is approximately adjacent the path of a projectile to be shot from the gun and is directed along the path in the direction of motion of the projectile.

9. The combination of claim 8 wherein the gun is a paintball gun and the projectile is a paintball.

10. The combination of claim 8 wherein the gun is a firearm and the projectile is a bullet.

11. The combination of claim 7 for measuring the speed of an arrow being shot from a bow, and wherein:
the implement is a bow; and
the speed measuring device is mounted on the bow such that the at least one antenna element
is spaced forward of the bow, and forward of at least most of an arrow that is to be shot from the bow, when the bow is drawn,
is approximately adjacent the path of the arrow, and
is directed along the path in the direction of motion of the arrow.

12. A method of measuring the speed of a sports projectile being shot or launched from a shooting or launching implement, the method comprising:
providing a transmitter/receiver, at least one antenna element connected to the transmitter/receiver, a signal processor having a processor input connected to the transmitter/receiver, and a visual display having a display input connected to the signal processor;
positioning the at least one antenna element on the implement from which the projectile is being shot and forward thereof in close proximity to a path to be taken by the projectile in leaving the implement;
when the projectile is shot from the implement, displaying on the display a digital representation of the speed of the projectile leaving the implement by producing an RF signal with the transmitter/receiver, transmitting the RF signal via the antenna element and radiating the RF signal from the antenna element adjacent the implement along the path being taken by the projectile, reflecting the RF signal from the projectile, the reflected RF signal containing a Doppler signal related to the speed of the projectile moving from the implement, receiving the reflected signal with the antenna element adjacent the implement, communicating the reflected signal from the antenna element to the transmitter/receiver, detecting the Doppler signal from the reflected signal with the transmitter/receiver, processing the detected Doppler signal with the signal processor and in response thereto outputting a digital representation of the speed of the projectile leaving the implement on the display.

13. The method of claim 12 wherein the projectile is a marker being shot from a paint ball gun and wherein:
the positioning includes positioning the at least one antenna element adjacent to the a barrel of a paint ball gun in close proximity to the path of markers shot from the barrel; and
when a marker is shot from the gun, displaying on the display a digital representation of the speed of the marker leaving the barrel by producing an RF signal with the transmitter/receiver, transmitting the RF signal via the antenna element and radiating the RF signal from the antenna element adjacent the barrel along the path of the marker leaving the barrel, reflecting the RF signal from the marker from the barrel, the reflected RF signal containing a Doppler signal related to the speed of the marker moving away from the barrel, receiving the reflected signal with the antenna element adjacent the barrel, communicating the reflected signal from the antenna element to the transmitter/receiver, detecting the Doppler signal from the reflected signal with the transmitter/receiver, processing the detected Doppler signal with the signal processor and in response thereto outputting a digital representation of the speed of the marker leaving the barrel on the display.

14. The method of claim 13 further comprising:
adjusting the speed of the marker leaving the barrel of the paintball gun in response to the detected Doppler signal.

15. The method of claim 12 wherein the projectile is an arrow shot from a bow and wherein:
the positioning includes positioning at least one antenna element on the bow and forward thereof in close proximity to the path of arrows shot from the bow;

when an arrow is shot from the bow, displaying on the display a digital representation of the speed of the arrow leaving the bow by producing an RF signal with the transmitter/receiver, transmitting the RF signal via the antenna element and radiating the RF signal from the antenna element adjacent the bow along the path of the arrow, reflecting the RF signal from the arrow from the bow, the reflected RF signal containing a Doppler signal related to the speed of the arrow moving from the bow, receiving the reflected signal with the antenna element adjacent the bow, communicating the reflected signal from the antenna element to the transmitter/receiver, detecting the Doppler signal from the reflected signal with the transmitter/receiver, processing the detected Doppler signal with the signal processor and in response thereto outputting a digital representation of the speed of the arrow leaving the bow on the display.

\* \* \* \* \*